US012071846B2

(12) United States Patent
Johnson

(10) Patent No.: US 12,071,846 B2
(45) Date of Patent: Aug. 27, 2024

(54) INTERMITTENT WELL STATE SAMPLING IN MANAGED PRESSURE DRILLING APPLICATIONS

(71) Applicant: Grant Prideco, Inc., Houston, TX (US)

(72) Inventor: Austin Johnson, Houston, TX (US)

(73) Assignee: GRANT PRIDECO, INC., Houston, TX (US)

( * ) Notice: Subject to any disclaimer, the term of this patent is extended or adjusted under 35 U.S.C. 154(b) by 343 days.

(21) Appl. No.: 17/715,775

(22) Filed: Apr. 7, 2022

(65) Prior Publication Data

US 2022/0228477 A1 Jul. 21, 2022

Related U.S. Application Data

(63) Continuation of application No. PCT/US2020/053009, filed on Sep. 28, 2020.

(60) Provisional application No. 62/913,286, filed on Oct. 10, 2019.

(51) Int. Cl.

| | |
|---|---|
| ***E21B 47/10*** | (2012.01) |
| ***E21B 21/08*** | (2006.01) |
| ***E21B 34/08*** | (2006.01) |
| ***E21B 47/06*** | (2012.01) |
| ***G08B 21/18*** | (2006.01) |

(52) U.S. Cl.
CPC .............. *E21B 47/10* (2013.01); *E21B 34/08* (2013.01); *E21B 47/06* (2013.01); *G08B 21/182* (2013.01); *E21B 21/08* (2013.01)

(58) Field of Classification Search
CPC .......... E21B 47/10; E21B 47/06; E21B 21/08; E21B 34/08; G08B 21/182
See application file for complete search history.

(56) References Cited

U.S. PATENT DOCUMENTS 5,203,822 A * 4/1993 Gurich .................... G01M 3/26
73/149
9,527,683 B2 * 12/2016 Drebinger .............. B65G 53/66
11,466,524 B2 * 10/2022 Johnson .................. E21B 21/01
(Continued)

FOREIGN PATENT DOCUMENTS

WO WO-2017058161 A1 * 4/2017 ........... E21B 47/009
WO WO-2017059153 A1 * 4/2017 ............. E21B 21/08
(Continued)

*Primary Examiner* — Jonathan M Dunlap
(74) *Attorney, Agent, or Firm* — Basil M. Angelo; ANGELO IP

(57) ABSTRACT

A method of monitoring a well state with intermittent well state sampling includes determining a measured volume differential by measuring flow out of a wellbore, measuring flow into the wellbore, and calculating a difference between the measured flow out and the measured flow in. The method includes determining an expected volume differential by calculating a fluid volume of the wellbore system, determining a wellbore pressure difference, determining a well system bulk modulus, and multiplying the fluid volume of the wellbore by the wellbore pressure difference and dividing a result by the well system bulk modulus. If the expected volume differential is not substantially equal to the measured volume differential, reporting to the user that the well state is experiencing a significant change requiring user intervention.

20 Claims, 4 Drawing Sheets

(56) References Cited

U.S. PATENT DOCUMENTS

| | | | | |
|---|---|---|---|---|
| 2014/0163724 | A1* | 6/2014 | Drebinger | F04D 27/00<br>700/230 |
| 2016/0084189 | A1* | 3/2016 | Pursifull | F02M 63/0285<br>123/456 |
| 2016/0245027 | A1* | 8/2016 | Gumus | E21B 44/00 |
| 2018/0187498 | A1* | 7/2018 | Sanchez Soto | E21B 21/08 |
| 2020/0363289 | A1* | 11/2020 | Shekhar | E21B 21/065 |
| 2022/0307370 | A1* | 9/2022 | Rowe | E21B 21/01 |
| 2022/0397008 | A1* | 12/2022 | Lafond | E21B 21/08 |
| 2023/0036473 | A1* | 2/2023 | Krivitski | A61M 1/3639 |

FOREIGN PATENT DOCUMENTS

| | | | | |
|---|---|---|---|---|
| WO | WO-2017213513 A1 * | 12/2017 | | E21B 21/08 |
| WO | WO-2018044288 A1 * | 3/2018 | | G01N 3/12 |
| WO | WO-2018118455 A1 * | 6/2018 | | E21B 47/0003 |
| WO | WO-2019013648 A1 * | 1/2019 | | E21B 21/003 |
| WO | WO-2019152950 A1 * | 8/2019 | | E21B 21/065 |

* cited by examiner

INTERMITTENT WELL STATE SAMPLING IN MANAGED PRESSURE DRILLING APPLICATIONS

CROSS-REFERENCE TO RELATED APPLICATIONS

This application is a continuation of PCT International Application PCT/US2020/053009, filed on Sep. 28, 2020, which claims the benefit of, or priority to, U.S. Provisional Patent Application Ser. No. 62/913,286, filed on Oct. 10, 2019, both of which are hereby incorporated by reference in their entirety for all purposes.

BACKGROUND OF THE INVENTION

A closed-loop hydraulic drilling system uses a wellbore sealing system, one or more components of which are sometimes referred to individually or collectively as a managed pressure drilling ("MPD") system, to actively manage wellbore pressure during drilling and other operations. In onshore and certain offshore applications, a conventional blowout preventer ("BOP") is disposed on the surface above the wellbore. The MPD system typically includes an annular sealing system, or functional equivalent thereof, disposed above, and in fluid communication with, the BOP. The annular sealing system typically includes a rotating control device ("RCD"), an active control device ("ACD"), or other type or kind of annular sealing system that seals the annulus surrounding the drill string while the drill string is rotated. A side return port, either integrated into the housing of the annular sealing system itself or configured as a separate component interposed between the BOP and the annular sealing system, diverts returning fluids from the annulus below the annular seal to the drilling rig. The side return port is in fluid communication with a choke valve that is in fluid communication with a mud-gas separator, shale shaker, or other fluids processing system configured to receive returning fluids to be recycled and reused. The encapsulation of the annulus allows for the application of surface backpressure and control of wellbore pressure through manipulation of the choke valve that diverts the returning fluids to the rig.

In certain offshore applications, including deepwater, a subsea blowout preventer ("SSBOP") is typically disposed at or near the sea floor above the wellbore. The MPD system typically includes an annular sealing system, a drill string isolation tool, and a flow spool, or functional equivalents thereof, in fluid communication with the SSBOP by way of a marine riser system disposed therebetween. The annular sealing system typically includes an RCD, ACD, or other type of annular sealing system that seals the annulus surrounding the drill string while the drill string is rotated. The drill string isolation tool, or equivalent thereof, is disposed below the annular sealing system and includes an annular packer that controllably encapsulates the well and maintains annular pressure when rotation has stopped or the annular sealing system, or components thereof, are being installed, serviced, removed, or otherwise disengaged. The flow spool, or equivalent thereof, is disposed below the drill string isolation tool and, as part of the pressurized fluid return system, controllably diverts returning fluids from the annulus below the annular seal to the surface. The flow spool includes a side return port that is in fluid communication with a choke valve, typically disposed on a platform of the floating rig, that is in fluid communication with a mud-gas separator, shale shaker, or other fluids processing system configured to receive returning fluids to be recycled and reused. The encapsulation of the annulus allows for the application of surface backpressure, and thereby control of wellbore pressure, through manipulation of the choke valve that diverts returning fluids to the rig.

In both onshore and offshore applications, the pressure tight seal on the annulus allows for control of wellbore pressure by manipulation of the choke aperture of the choke valve and the corresponding application of surface backpressure. For example, in certain applications, an MPD system may be used to maintain wellbore pressure within a pressure gradient bounded by the pore pressure and the fracture pressure to avoid the unintentional influx of unknown formation fluids, sometimes referred to as a kick, into the well or marine riser or fracture the formation resulting in the loss of expensive drilling fluids to the formation. Similarly, in other exemplary applications, applied surface backpressure ("ASBP") MPD, commonly referred to as ASBP-MPD, may be used to augment the annular pressure profile and improve the rig's response capability to drilling contingencies. As drillers take on more challenging well plans, the ability to control wellbore pressure is becoming increasingly more important to the feasibility, economic viability, and safety of operations.

BRIEF SUMMARY OF THE INVENTION

According to one aspect of one or more embodiments of the present invention, a method of monitoring a well state with intermittent well state sampling includes determining a measured volume differential by measuring flow out of a wellbore, measuring flow into the wellbore, and calculating a difference between the measured flow out and the measured flow in. The method further includes determining an expected volume differential by calculating a fluid volume of the wellbore system, determining a wellbore pressure difference, determining a well system bulk modulus, and multiplying the fluid volume of the wellbore by the wellbore pressure difference and dividing a result by the well system bulk modulus. If the expected volume differential is not substantially equal to the measured volume differential, reporting to the user that the well state is experiencing a significant change requiring user intervention.

Other aspects of the present invention will be apparent from the following description and claims.

DETAILED DESCRIPTION OF THE INVENTION

Figure 1:
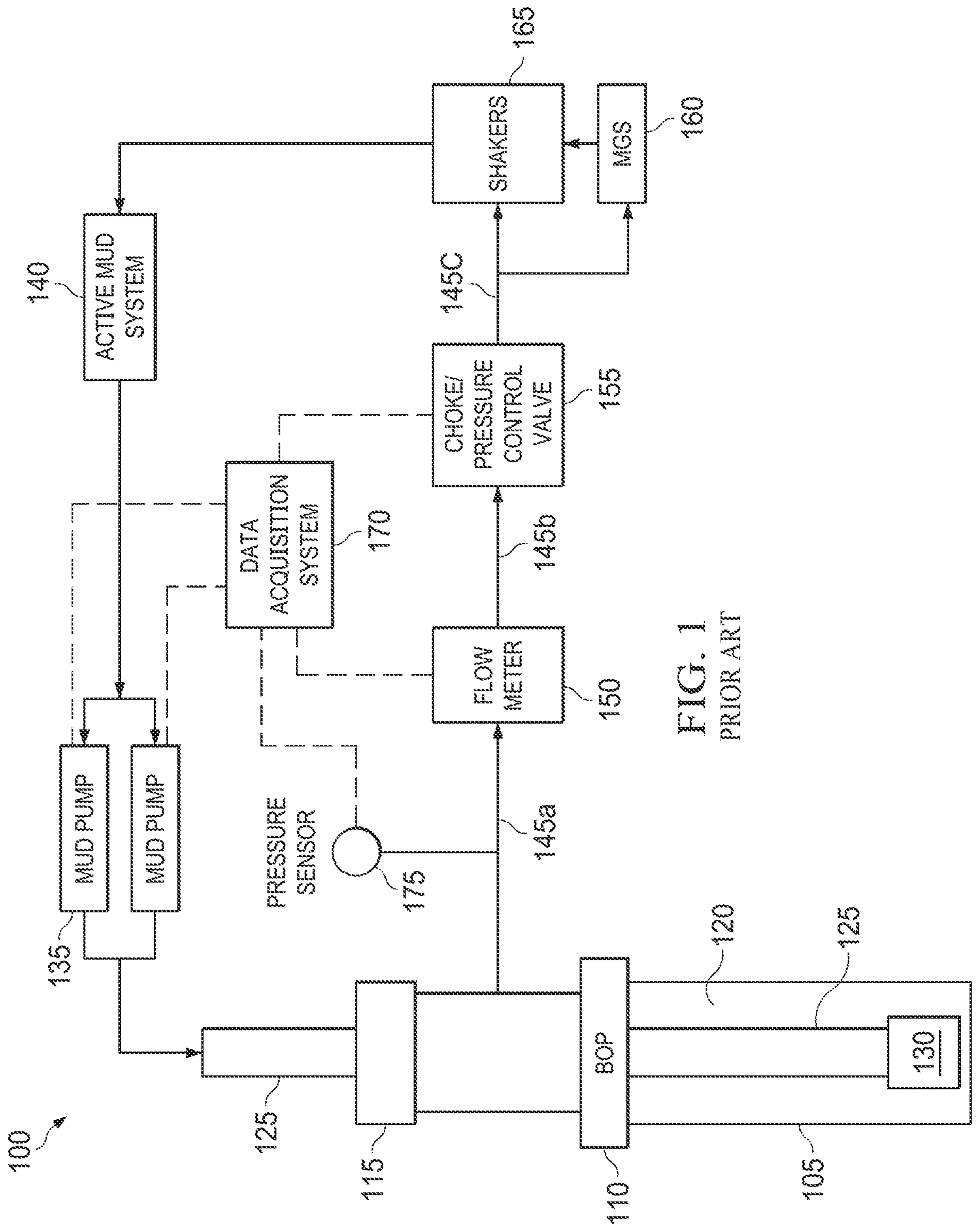
FIG. 1 PRIOR ART
FIG. 1 shows a conventional closed-loop hydraulic drilling system for drilling a subterranean wellbore.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

FIG. 1 shows a conventional closed-loop hydraulic drilling system 100 for drilling a subterranean wellbore 105 in an onshore, shallow water, or offshore application. In certain onshore or shallow water applications, BOP 110 is typically disposed above, and in fluid communication with, a wellhead (not independently shown) that is disposed above, and in fluid communication with, wellbore 105. A central lumen extends through BOP 110, the wellhead (not independently shown), and into wellbore 105 to facilitate drilling and other operations. In offshore applications, including those in deepwater, BOP 110 is typically a SSBOP disposed in the water on or near the sea floor and in fluid communication with a wellhead (not shown) that is disposed above, and in fluid communication with, wellbore 105 disposed there below. In such embodiments, BOP 110 is typically disposed below, but in fluid communication with, a marine riser system (not independently shown) that fluidly communicates with a conventional MPD system. Similarly, a central lumen extends through the conventional MPD system, the marine riser system (not independently shown), BOP 110, the wellhead (not independently shown), and into wellbore 105 to facilitate drilling and other operations.

The conventional MPD system typically includes at least an annular sealing system 115 that controllably seals annulus 120 surrounding drill string 125 such that annulus 120 is encapsulated and not exposed to the atmosphere. Annular sealing system 115 may be an RCD, ACD, or any other type or kind of sealing system that sufficiently seals annulus 120 such that wellbore 105 pressure may be controlled by the application of surface backpressure. A distal end of drill string 125 may include a bottomhole assembly or drill bit 130 configured to drill wellbore 105. During conventional drilling operations, one or more mud pumps 135 may be configured to controllably pump drilling fluids (not shown) from active mud system 140 downhole through drill string 125. The returning fluids (not shown) return through annulus 120 surrounding drill string 125 and are controllably diverted from a side return port (not independently shown) disposed below the annular seal (not independently shown). Specifically, the returning fluids (not shown) are diverted via fluid lines 145 to flow meter 150, a pressure control valve, sometimes referred to as choke valve or MPD choke valve, 155, and one or more fluids processing systems such as, for example, mud-gas-separator 160 and/or shale shaker 165 prior to returning the processed fluids (not shown) to active mud system 140 for reuse. A pressure sensor 175 may be disposed in the fluid path to measure hydrostatic pressure of the returning fluids (not shown).

During conventional drilling operations, a data acquisition and control system 170 may receive pressure sensor 175 data and flow meter 150 data in approximate or near real-time. One of ordinary skill in the art will recognize that near real-time means data is received very nearly when measured, delayed by measurement, calculation, or transmission only. The data acquisition and control system 170 may control the flow rate of mud pumps 135, thereby controlling the injection rate of fluids downhole. In addition, data acquisition and control system 170 may command choke valve 155 to a desired choke aperture setting, thereby controlling the flow out. As noted above, the pressure tight seal on the annulus provided by annular sealing system 115 allows for the control of wellbore pressure by manipulation of the choke aperture of choke valve 155 and the corresponding application of surface backpressure. The choke aperture of choke valve 155 corresponds to an amount, typically represented as a percentage, that choke valve 155 is open. For example, the choke valve may be fully closed, fully open, or somewhere in between with a plurality of intermediate settings that refer to some degree of openness. If the driller wishes to increase wellbore 105 pressure, the choke aperture of choke valve 155 may be reduced to further restrict fluid flow and apply additional surface backpressure. Similarly, if the driller wishes to decrease wellbore 105 pressure, the choke aperture of choke valve 155 may be increased to increase fluid flow and reduce the amount of applied surface backpressure. As such, conventional MPD systems typically manage wellbore pressure by manipulating the choke aperture of choke valve 155, based solely on pressure sensor 175 data.

Conventionally, during drilling operations, flow out is expected to be approximately equal to flow in, resulting in a differential flow rate, sometimes referred to as the delta flow rate, of approximately zero within predetermined margins of error. The differential flow rate is typically calculated as the difference between instantaneous measurements of flow out and flow in as a function of time. Conventionally, unanticipated changes in the differential flow rate, if significant enough, may be used to detect the occurrence of a kick, loss, connection to an additional hydraulic volume, or other well control event. As such, conventional MPD systems typically sample, on an on-going basis, instantaneous pressure, flow out, and flow in with respect to time. In typical applications, the driller monitors fluid gains or losses over time based on tank volume levels on the surface. However, this typically requires a substantial accumulation of fluids in the tanks before a reliable detection can be made, which necessarily requires that the accumulation transit the system before such a detection is even possible on the surface. In other applications, with sufficient instrumentation, the driller may measure flow out and flow in and calculate the differential flow rate as a function of time. Simplistically, the driller may determine that a kick has occurred if the flow out of the well is greater than the flow into the well. Similarly, the driller may determine that a loss has occurred if the flow out of the well is less than flow into the well. However, such generalized characterizations lack precision and nuance and fail to convey the nature and magnitude of the potentially compound events giving rise to the differential and are not timely determined, requiring either pressure or fluids to transit the system before detection is even possible. Advantageously, in one or more embodiments of the present invention, there is more information that is knowable and actionable in the dynamic system derived from the compressibility of fluids disposed within the wellbore system.

Figure 2:
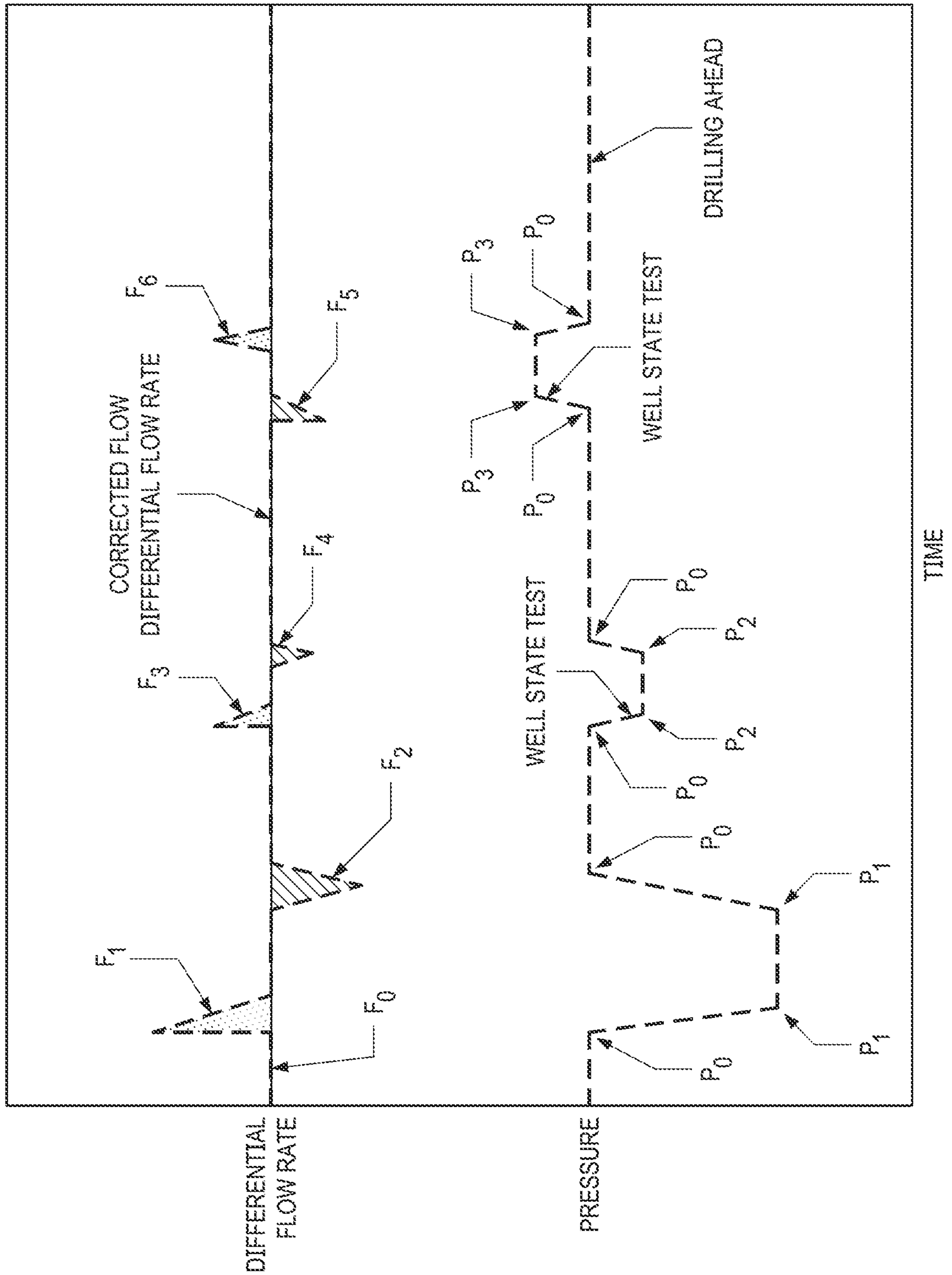
FIG. 2 shows transient wellbore storage and discharge volumes based on changes to the wellbore pressure in accordance with one or more embodiments of the present invention.

FIG. 2 shows transient wellbore storage and discharge volumes based on changes to the wellbore pressure in accordance with one or more embodiments of the present invention. For the purposes of this discussion, wellbore storage refers to the ability of the wellbore system to store fluids as a function of pressure and wellbore discharge refers to the ability of the wellbore system to source fluids stored therein as a function of pressure, where the transient differential flow rate is dominated by the compressibility and volume of wellbore fluids. Since the wellbore pressure is typically managed by controlling the application of applied surface backpressure at the choke valve disposed on the surface, it is important to note that there is a time delay between pressure changes initiated at the surface and when the pressure change has fully transited through the well system.

In the figure, for the purposes of illustration, the differential flow rate and wellbore pressure are shown separately but on the same time axis. The initial wellbore pressure, $P_0$, is held approximately constant resulting in an approximately constant differential flow rate, $F_0$. While the differential flow rate could be net positive, zero, or negative, for the purposes of this discussion we will assume that the constant differential flow rate means approximately net zero differential flow rate where flow out of the wellbore is approximately equal to flow into the wellbore, representing nominal drilling conditions without unexpected fluid gains or losses. However, the wellbore pressure varies based on the operations being conducted. For example, for whatever reason, the wellbore pressure may be ramped down (decreased) from $P_0$ to $P_1$, typically in the range between 10 and 500 pounds per square inch ("psi") but may vary, resulting in a transient discharge $F_1$ from wellbore storage that produces a transient increase in the differential flow rate. Similarly, the wellbore pressure may be ramped up (increased) from $P_1$ to $P_0$, resulting is a transient increase in wellbore storage volume $F_2$ that produces a transient decrease in the differential flow rate.

While the magnitude of wellbore storage or discharge varies based on well characteristics, change in wellbore pressure may be the primary controllable driver of the variation. In this way, reductions in pressure tend to result in increases in wellbore discharge volumes and increases in pressure tend to result in increases in wellbore storage volumes. For example, during a well state test, the pressure may be ramped down from $P_0$ to $P_2$, which represents a smaller reduction in pressure than $P_0$ to $P_1$, resulting is a transient discharge $F_3$ from wellbore storage that is also smaller in magnitude. Similarly, the wellbore pressure may be ramped back up from $P_2$ to $P_0$, resulting is a transient increase in wellbore storage volume $F_4$ and a transient decrease in the differential flow rate. Going the other way, the wellbore pressure may be ramped up from $P_0$ to $P_3$, representing an increase in pressure, resulting is a transient increase in wellbore storage volume $F_5$ and a transient decrease in the differential flow rate. Similarly, the wellbore pressure may be ramped down from $P_3$ to $P_0$, resulting in a transient discharge $F_6$ from wellbore storage and a transient increase in the differential flow rate.

The transient behavior of wellbore storage or discharge as a function of wellbore pressure may be better understood in terms of fluid compressibility. While the conventional engineering simplification of the complex and dynamic wellbore system dictates that fluids are assumed to be incompressible, in reality, all fluids within the dynamic wellbore system are in fact compressible. As such, the fluid compressibility of the fluids within the system, knowledge of the well geometry, and volumetrics, may be used to better understand the current state and dynamics of the system and respond to contingencies in a more timely and appropriate manner.

Bulk modulus is typically defined as the measure of a fluids resistance to compression and is the inverse of compressibility. Generally speaking, the higher the bulk modulus, the less the fluids will compress as a function of pressure and the lower the bulk modulus, the more the fluids will compress as a function of pressure. In a dynamic wellbore system, there are injected drilling fluids, primarily comprised of liquids or gasses, and returning fluids that may include liquids, solids, and gasses, all of which are compressible. In addition, somewhat counterintuitively, the wellbore structure itself has a bulk modulus. Observations in deep water have shown that, following a wellbore annular pressure profile change, the wellbore itself tends to breathe in and out, believed to be a result of the varying bulk modulus of the formation or fluids contained therein, that produces measurable changes in downhole pressure. As such, the bulk modulus of the wellbore system may include the bulk modulus of the fluids disposed therein as well as the bulk modulus of the wellbore itself. While the discussion that follows could be written in terms of changing bulk modulus, it is believed that personnel involved with operations will more readily appreciate changing volumes as it is metric more closely tied to their experience in conducting drilling operations. As such, the discussion that follows focuses on measured versus expected volume differentials and the insight gleaned from that analysis, but could be equivalently cast in terms of compressibility or bulk modulus.

The measured volume differential of the wellbore may be represented by equation (1) shown below:

$$\Delta V_M = \int_{t0}^{t1} \Delta Q dt \tag{1}$$

where Q represents the differential flow rate defined by flow out minus flow in. In a conventional MPD system, flow out may be measured using a flow meter such as, for example, a Coriolis flow meter, wedge meter, or similar device for measuring volumetric fluid flow rate in the return path. In a conventional MPD system, flow out is typically measured immediately downstream of a pressure control device such as a choke valve, however in some instances, flow out may be measured upstream of the choke valve, i.e., flow meter 150 of FIG. 1. Flow in may be measured using a flow meter such as, for example, a Coriolis flow meter, wedge meter, or similar device for measuring volumetric fluid flow rate, near the injection. In a conventional MPD system, flow in may also be somewhat reliably estimated using the positive displacement mud pump speed, pump configuration, and known fluid properties. Typically, individual meters or measurement devices will provide data to a centralized data acquisition and control system which processes signals and stores values. The data acquisition and control system in a typical MPD system may generate records, or snap shots of measurement values in time, at a rate of once per second, though this rate may be faster or slower. The data acquisition and control system may be configured to calculate the difference between flow out and flow in and store the differential flow rate value when a record is generated. The data acquisition and control system may further integrate values representing a difference between flow out and flow in over a period of time, yielding a value for the total measured volume difference between flow out and flow in during a period.

Advantageously, in contrast to the measured volume differential, an expected volume differential may be calculated for the same time interval as set out in equation (2) shown below:

$$\Delta V_E = \frac{V * (P_{t1} - P_{t0})}{\beta} \tag{2}$$

where P represents pressure, V represents the total well volume, and β represents the bulk modulus of the entire well system. The total well volume, V, may be calculated using the known geometry of the wellbore and hydraulically connected volumes. For example, a tubular of known length and inner diameter will have a calculable internal volume. Additionally, a drill bit of known diameter will construct a bore of known diameter while drilling a section of a certain length, enabling the calculation of the wellbore volume with a high degree of accuracy. Factors such as, for example, stresses in the formation or chemical dissolution may cause the wellbore to be out of gauge, having a different diameter than the drill bit, thereby affecting wellbore volume. Such naturally occurring differences may be a concern in open hole sections, or sections without protective casing strings installed, and may be corrected by measuring the volume of cuttings coming out of the well, applying wellbore diameter gauge measurement corrections, or through offline calibration procedures. Similarly, the bulk modulus, β, of the well system may be measured for nearly any material with a known volume, V. As pressure, P, is applied or reduced from one value $P_{t1}$ to a second value $P_{t2}$, the volume, V, undergoes a slight change ΔV. For mixtures including mixtures of liquids and solids, the bulk modulus, β, of the well system may be measured in the same way where the resulting β value, includes bulk modulus contributions of all phases present.

In essence, the calculated volume V may be used to find a benchmark value of the bulk modulus, β, of the well system. As operations progress, the calculated volume V may be updated. From there, whenever a pressure change is applied, the bulk modulus, β, may be used to calculate an expected ΔV. In addition, the bulk modulus, β, may be updated when a new value of measured ΔV is recorded. Assumptions feeding into the calculation of volume V may also be updated arbitrarily. A form of online calibration may be possible using fluid loss, downhole pressure, and cuttings load. A process for measuring the bulk modulus, β, of a well system may be performed regularly in conjunction with routine drilling operations that result in a pressure change, such as performing a connection, or in an offline calibration step. As such, with mere volumetrics including wellbore depth, casing program, drill string diameter, and other factors, we may calculate an expected differential flow rate for a given value of β, that is updated on a regular basis as discussed above. However, it may only be necessary to calculate $\Delta V_E$ during and after transient events, for example, well state testing or sampling, thereby reducing the need for high accuracy and high reliability flow instrumentation equipment. Given the inverse relationship between the two variables (compressibility and bulk modulus), one of ordinary skill in the art will recognize that equation (2) may be written in terms of compressibility rather than the bulk modulus of the well system in accordance with one or more embodiments of the present invention.

Based on the measured volume differential and expected volume differential value, and the differences between them, we can provide additional meaning to the discrepancies between flow out and flow in and gain further insight into the quality and quantity of the fluids in the well, and potentially contingencies thereof. For example:

$$\text{If } \Delta V_M \neq \Delta V_E \text{ then a kick, a loss, or another event has occurred; or} \quad (3)$$

$$\text{If } \Delta V_M \approx \Delta V_E \text{ then the system is balanced.} \quad (4)$$

Conventional MPD methods may only consider the $\Delta V_M$ variable, limiting the scope of investigation to the wellbore inlet and wellbore outlet, and relying primarily on data that has transited the well system and is measured on the surface. Advantageously, by comparing $\Delta V_M$ and $\Delta V_E$, the scope of investigation may be expanded beyond the wellbore inlet and wellbore outlet to include information regarding downhole fluid interactions with other fluids, rock formations, and gases. Moreover, when $\Delta V_M \neq \Delta V_E$, we know that one of the following occurred: that a significant volume of hydraulically connected fluid has been introduced into the system, that the fluids bulk modulus has changed meaning the introduction or swapping of wellbore fluids for formation fluids, or a flow rate measurement is incorrect. Perhaps more importantly, a more accurate kick or loss detection mechanism may be implemented.

For example, following a kick, a wellbore may contain significant amounts of dissolved gas which may not be immediately observable using only $\Delta V_M$, which is directly measured. If the system were to calculate a $\Delta V_E$ value using the last known value for β while applying a change in wellbore pressure P, the values of $\Delta V_M$ and $\Delta V_E$ would be substantially different, indicating a substantial change in the bulk modulus value which corresponds to the new fluid composition, strongly suggesting a kick that contains dissolved gas, without requiring any gas to transit the well system prior to detection.

In a second example, a wellbore may penetrate a large hydraulically connected volume such as a fractured zone. During a connection, the rig may add wellbore pressure to offset the pressure loss observed when switching from dynamic to static states while the system directly measures $\Delta V_M$ on a continuous basis. The change in wellbore pressure may trigger calculation of a new β value which may result in a substantially different value for $\Delta V_E$ due to the increase in V. Such improvements to information quality are provided for illustration only and are not limited to such examples.

While the bulk modulus may be calculated at any time, it may be helpful to use pressure changes or other events as triggers to calculate new values of bulk modulus, with the latest value being used calculations until it is itself updated. For purposes of this discussion, a well state sample may be synonymous with a change in pressure, where the only restriction to how many times this is done is the frequency of pressure changes. However, changes in volume without a corresponding change in pressure will not provide a useable sample.

Figure 3:
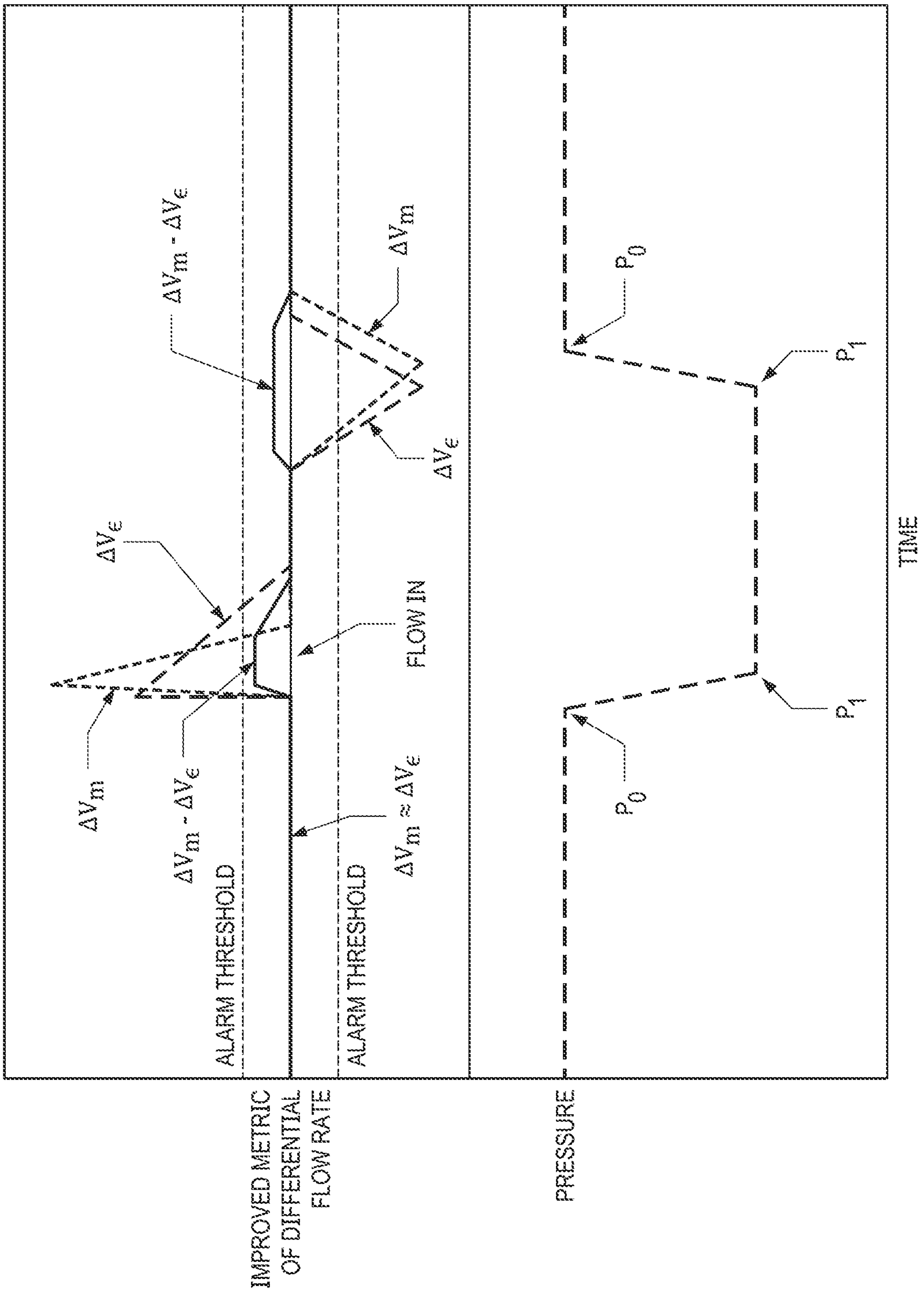
FIG. 3 shows an improved metric of differential flow rate used to more accurately detect well control events in accordance with one or more embodiments of the present invention.

FIG. 3 shows an improved metric of differential flow rate used to more accurately detect well control events in accordance with one or more embodiments of the present invention. As noted above, we have the ability to continuously or at least periodically measure $\Delta V_M$, which corresponds to what has traditionally been done in conventional MPD systems. However, mere measurement falls short because it can only describe conditions of well system when the fluids arrive at the surface, after having transited the well system. This is particularly dangerous if the fluids contain potentially explosive gasses that transit the marine riser. An improved metric of differential flow rate enables the rig to utilize the existing $\Delta V_M$ signal along with pressure changes occurring while drilling the wellbore to provide qualitative and quantitative information about downhole conditions. As such, a data acquisition and control system on the rig may calculate the estimated volume differential $\Delta V_E$, which takes into account well geometry and volumetrics by way of total well volume V and bulk modulus β of the entire well system. Advantageously, the difference between the two quantities represents an improved metric of differential flow rate that may be used to more accurately determine whether a well control event has occurred.

For example, as shown in the figure, as the wellbore pressure $P_0$ is held approximately constant, the differential flow rate is approximately constant and zero because $\Delta V_M \approx \Delta V_E$. As the pressure is ramped down from $P_0$ to $P_1$, there is a transient discharge from wellbore storage that produces a transient increase in the differential flow rate, meaning flow out exceeds that of flow in during the transient period. While the measured volume differential $\Delta V_M$ is a measured value, it tends to lag the causal event of the pressure change because it must transit the system and is measured at the surface. However, the expected volume differential $\Delta V_E$ is a calculated value as discussed above taking into consideration well geometry and volumetrics. The calculated difference between the measured volume differential and the expected volume differential $\Delta V_M - \Delta V_E$ represents the improved metric of differential flow rate, which more accurately reflects meaningful variations in flow rates. In this instance, since there was a transient discharge of fluids from the wellbore, the improved metric of differential flow rate is positive during the transient period. One or more alarm thresholds may be predetermined by the driller to assist in identifying well control events. If the improved metric of differential flow rate exceeds the threshold, a well control event has occurred that requires intervention by the driller. Further information about the nature of the well control event may be determined by changes in volume and compressibility. Otherwise, if the value falls within the thresholds, the driller may ignore the transient change as just that, a transient event due to the well system bulk modulus and compressibility of fluids contained therein.

Similarly, the wellbore pressure may be ramped up from $P_1$ to $P_0$, resulting is a transient increase in wellbore storage volume that produces a transient decrease in the improved metric of differential flow rate, meaning flow out is less than that of flow in during the transient period. The calculated difference between the measured volume differential and the expected volume differential $\Delta V_M - \Delta V_E$ results in a negative value, meaning a somewhat counter intuitive increase in the metric of differential flow rate, where a decrease was expected. If the improved metric of differential flow rate exceeds the threshold, a well control event has occurred that requires intervention by the driller. Further information about the nature of the well control event may be determined by changes in volume and compressibility. Otherwise, if the value falls within the thresholds, the driller may ignore the transient change as just that, a transient event due to the well system bulk modulus and compressibility of fluids contained therein. In this way, the driller may more accurately detect a well control event based on not only measured flow rates, but total well volume, well system bulk modulus, well geometry, and volumetrics using a calculated value that advantageously leads the measured volume differential.

In one or more embodiments of the present invention, a method of monitoring a well state with intermittent well state sampling may include one or more of calculating a measured volume differential, calculating an expected volume differential, and calculating an improved metric of differential flow rate based on a difference between the measured volume difference and the expected volume difference. Advantageously, a kick, loss, hydraulic connection to an additional fluid volume, or other well control event may be detected earlier than conventional means and more qualitative and quantitative information regarding the type or kind of event, and the challenges it poses, such that the driller may take appropriate action in a more timely manner.

Calculating the measured volume differential may include measuring flow out of a wellbore, measuring flow into the wellbore, and calculating a difference between the measured flow out and the measured flow in. Flow out may be measured with a Coriolis flow meter, a wedge meter, or other device of measuring volumetric flow rate. The measurement of flow out may be an instantaneous value or a continuous values. In certain embodiments, measuring flow out of the wellbore may include measuring an instantaneous value of flow out and storing the instantaneous values in the data acquisition and control system. In other embodiments, measuring flow out of the wellbore may include continuously measuring flow out and storing continuous values in the data acquisition and control system. Flow in may be measured with a Coriolis flow meter, a wedge meter, or other device of measuring volumetric flow rate. The measurement of flow in may be an instantaneous value or continuous values. In certain embodiments, measuring flow into the wellbore may include measuring an instantaneous value of flow in and storing the instantaneous values in the data acquisition and control system. In other embodiments, measuring flow in of the wellbore may include continuously measuring flow in and storing continuous values in the data acquisition and control system. In certain embodiments, calculating the measured volume differential may include calculating a difference between measured instantaneous values of flow out and instantaneous values of flow in. In such embodiments, the data acquisition and control system may calculate the measured volume differential based on instantaneous values of flow out and flow in continuously or with predetermined periodicity. In other embodiments, calculating the measured volume differential may include calculating a difference between continuous values of flow out and continuous values of flow in. In such embodiments, the data acquisition and control system may calculate the measured volume differential based on continuous values of flow out and flow in continuously, at predetermined times, or with predetermined periodicity.

Calculating the expected volume differential may include calculating a fluid volume of the wellbore, determining a wellbore pressure difference, determining a well system bulk modulus, and multiplying the fluid volume of the wellbore by the wellbore pressure difference and dividing the result by the well system bulk modulus. The calculations may be performed by the data acquisition and control system based on inputted data including, for example, one or more of fluid volumes, wellbore pressure data, well geometry, volumetrics, and volume differentials. In certain embodiments, calculating the fluid volume of the wellbore may be calculated based on well geometry, fluid volumes, wellbore pressure data, well geometry, volumetrics, and volume differentials. In certain embodiments, the well system bulk modulus may be provided as input to the data acquisition and control system by a user. In other embodiments, the well system bulk modulus may be calculated based on one or more of historical fluid volumes, pressure data, and volume differentials. The well system bulk modulus may be updated as drilling progresses using an analysis of historical fluid volumes, pressure data, and volume differentials. However, in certain embodiments, a change in wellbore pressure may be used to initiate the calculation of a new well system bulk modulus. In other embodiments, a change in the measured flow into the wellbore may be used to initiate the calculation of a new well system bulk modulus. In certain embodiments, the expected volume differential may be calculated on a continuous basis, at predetermined times, or with predetermined periodicity. In certain embodiments, a change to measured flow out of the wellbore may be used to initiate the calculation of the expected volume differential. In other embodiments, a change to wellbore pressure may be used to initiate the calculation of the expected volume differential.

The improved metric of differential flow rate may be calculated by taking the difference between the measured volume differential and the expected volume differential. In certain embodiments, because changes in the expected volume differential may lead changes in the measured volume differential, the measured volume differential may be subtracted from the expected volume differential. In other embodiments, the expected volume differential may be subtracted from the measured volume differential. One of ordinary skill in the art will recognize that either calculation may be used and may vary based on an application or design in accordance with one or more embodiments of the present invention.

The method may further include controlling the wellbore pressure through applied surface backpressure with a pressure control valve, such as, for example, an MPD choke valve. In such embodiments, the wellbore pressure may be controlled by controlling the degree to which the pressure control valve is open, which may change according to a stepwise, sinusoidal, triangular, or other pattern change. The method may further include measuring wellbore pressure. As noted above, the wellbore pressure may be measured in a variety of ways, the result of which may be reported to the data acquisition and control system.

In certain embodiments, if the expected volume differential is not substantially equal to the measured volume differential, the data acquisition and control system may report to a user, such as, for example, a driller, that the well state is experiencing a significant change requiring user intervention. In other embodiments, a data acquisition and control system may provide a graphical display that shows instantaneous or continuous values for one or more of the measured volume differential, the expected volume differential, or the improved metric of differential flow rate. The plot may optionally include alarm boundaries for one or more of the graphical displays. In this way, the data acquisition and control system may provide graphical alerts and/or audible alerts when one or more of the values exceeds an alarm threshold or boundary.

In one or more embodiments of the present invention, intermittent well states may be sampled or tested periodically or when initiated by a triggering event, such as, for example, a wellbore pressure change, a change in flow out, or a change in flow in. If a well state sample determines that the expected volume differential is not substantially equal to the measured volume differential, the difference may be indicative of an unexpected influx of formation fluids, sometimes referred to as a kick, an unexpected loss of fluids to the formation, a connection of an additional hydraulic volume, or other well control event. Because the expected volume differential includes the well system bulk modulus, the compressibility of fluids within the well system may be indicative of the type or kinds of fluids. As such, the method of intermittent well sampling may be used for the early detection of kicks, losses, hydraulic connection of additional fluid volumes, or other well control events and provides qualitative and quantitative data on the nature of the event, importantly, before the fluids transit the well system or the data therein reaches the surface. The historic trend of well state samples may be indicative that the well state is improving, unchanged, or degrading over time. Advantageously, kicks containing explosive gases may be detected before the gases transit the well system or enter the marine riser system and other well control events may be more easily ascertained in a timely manner allowing for drilling contingencies.

Figure 4:
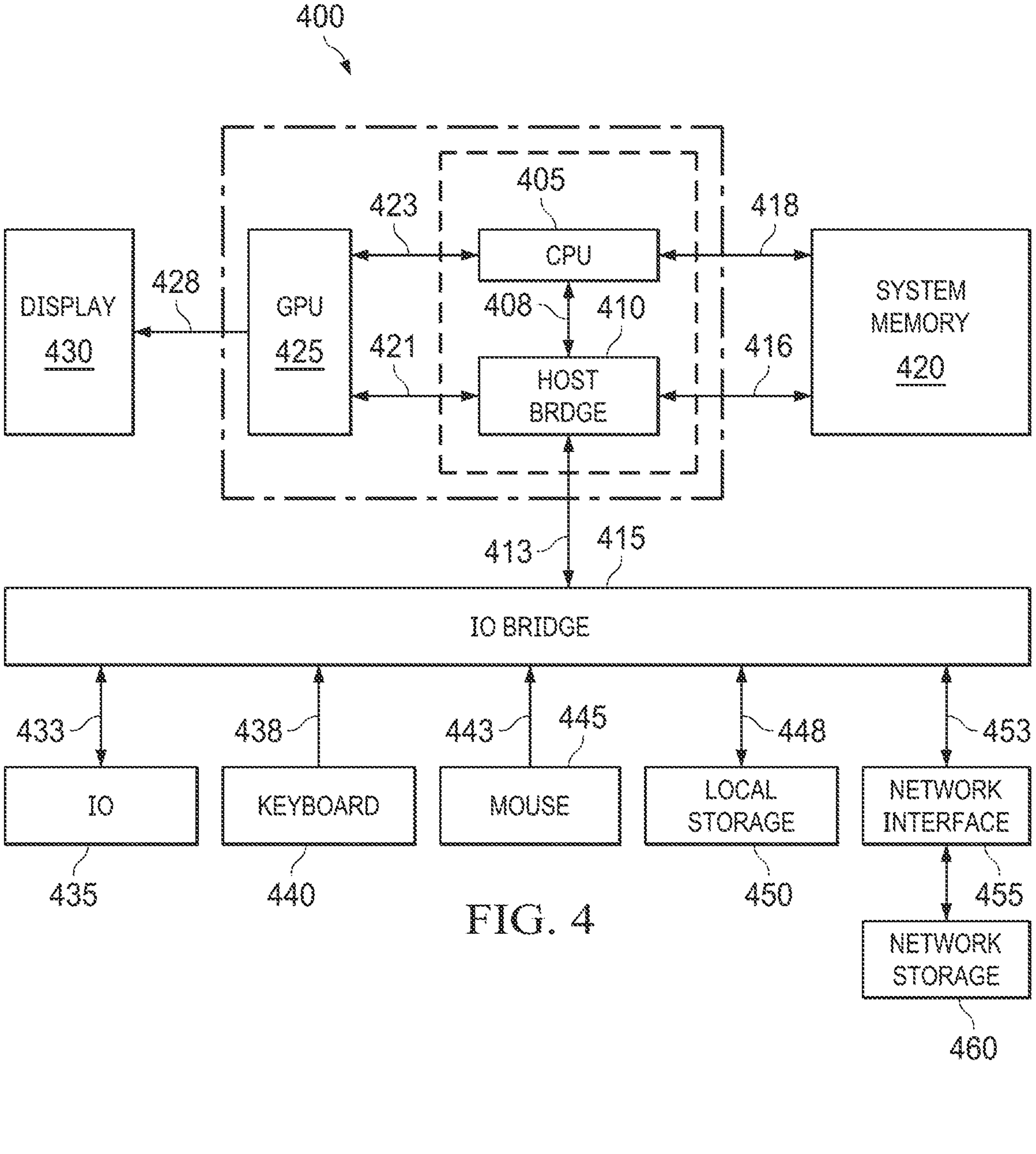
FIG. 4 shows a data acquisition and control system in accordance with one or more embodiments of the present invention.

FIG. 4 shows a data acquisition and control system 400 that may, for example, be used for calculating differential flow rates in accordance with one or more embodiments of the present invention. Data acquisition and control system 400 may include one or more central processing units (singular "CPU" or plural "CPUs") 405, host bridge 410, input/output ("IO") bridge 415, graphics processing units (singular "GPU" or plural "GPUs") 425, and/or application-specific integrated circuits (singular "ASIC or plural "ASICs") (not shown) disposed on one or more printed circuit boards (not shown) that perform computational operations. Each of the one or more CPUs 405, GPUs 425, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 405 may be a general-purpose computational device typically configured to execute software instructions. CPU 405 may include an interface 408 to host bridge 410, an interface 418 to system memory 420, and an interface 423 to one or more IO devices, such as, for example, one or more GPUs 425. GPU 425 may serve as a specialized computational device typically configured to perform graphics functions related to frame buffer manipulation. However, one of ordinary skill in the art will recognize that GPU 425 may be used to perform non-graphics related functions that are computationally intensive. In certain embodiments, GPU 425 may interface 423 directly with CPU 525 (and interface 418 with system memory 420 through CPU 405). In other embodiments, GPU 425 may interface 421 with host bridge 410 (and interface 416 or 418 with system memory 420 through host bridge 410 or CPU 405 depending on the application or design). In still other embodiments, GPU 425 may interface 433 with IO bridge 415 (and interface 416 or 418 with system memory 420 through host bridge 410 or CPU 405 depending on the application or design). The functionality of GPU 425 may be integrated, in whole or in part, with CPU 405.

Host bridge 410 may be an interface device that interfaces between the one or more computational devices and IO bridge 415 and, in some embodiments, system memory 420. Host bridge 410 may include an interface 408 to CPU 405, an interface 413 to IO bridge 415, for embodiments where CPU 405 does not include an interface 418 to system memory 420, an interface 416 to system memory 420, and for embodiments where CPU 405 does not include an integrated GPU 425 or an interface 423 to GPU 425, an interface 421 to GPU 425. The functionality of host bridge 410 may be integrated, in whole or in part, with CPU 405. IO bridge 415 may be an interface device that interfaces between the one or more computational devices and various IO devices (e.g., 440, 445) and IO expansion, or add-on, devices (not independently illustrated). IO bridge 415 may include an interface 413 to host bridge 410, one or more interfaces 433 to one or more IO expansion devices 435, an interface 438 to keyboard 440, an interface 443 to mouse 445, an interface 448 to one or more local storage devices 450, and an interface 453 to one or more network interface devices 455. The functionality of IO bridge 415 may be integrated, in whole or in part, with CPU 405 or host bridge 410. Each local storage device 450, if any, may be a solid-state memory device, a solid-state memory device array, a hard disk drive, a hard disk drive array, or any other non-transitory computer readable medium. Network interface device 455 may provide one or more network interfaces including any network protocol suitable to facilitate networked communications.

Data acquisition and control system 400 may include one or more network-attached storage devices 460 in addition to, or instead of, one or more local storage devices 450. Each network-attached storage device 460, if any, may be a solid-state memory device, a solid-state memory device array, a hard disk drive, a hard disk drive array, or any other non-transitory computer readable medium. Network-attached storage device 460 may or may not be collocated with data acquisition and control system 400 and may be accessible to data acquisition and control system 400 via one or more network interfaces provided by one or more network interface devices 455.

One of ordinary skill in the art will recognize that data acquisition and control system 400 may be a conventional computing system or an application-specific computing system (not shown). In certain embodiments, an application-specific computing system (not shown) may include one or more ASICs (not shown) that perform one or more specialized functions in a more efficient manner. The one or more ASICs (not shown) may interface directly with CPU 405, host bridge 410, or GPU 425 or interface through IO bridge 415. Alternatively, in other embodiments, an application-specific computing system (not shown) may be reduced to only those components necessary to perform a desired function in an effort to reduce one or more of chip count, printed circuit board footprint, thermal design power, and power consumption. The one or more ASICs (not shown) may be used instead of one or more of CPU 405, host bridge 410, IO bridge 415, or GPU 425. In such systems, the one or more ASICs may incorporate sufficient functionality to perform certain network and computational functions in a minimal footprint with substantially fewer component devices.

As such, one of ordinary skill in the art will recognize that CPU 405, host bridge 410, IO bridge 415, GPU 425, or ASIC (not shown) or a subset, superset, or combination of functions or features thereof, may be integrated, distributed, or excluded, in whole or in part, based on an application, design, or form factor in accordance with one or more embodiments of the present invention. Thus, the description of data acquisition and control system 400 is merely exemplary and not intended to limit the type, kind, or configuration of component devices that constitute a data acquisition and control system 400 suitable for performing computing operations in accordance with one or more embodiments of the present invention. Notwithstanding the above, one of ordinary skill in the art will recognize that data acquisition and control system 400 may be a standalone, laptop, desktop, industrial, server, blade, or rack mountable system and may vary based on an application or design.

Advantages of one or more embodiments of the present invention may include one or more of the following:

In one or more embodiments of the present invention, a method of monitoring a well state with intermittent well state sampling uses the transient behavior of wellbore storage and discharge volumes as a function of wellbore pressure and the inherent compressibility of fluids within the well system, as well as well geometry, and volumetrics to better understand the dynamics of the well system and to identify and respond to contingencies in a more timely and appropriate manner.

In one or more embodiments of the present invention, a method of monitoring a well state with intermittent well state sampling compares a measured volume differential and an expected volume differential to determine if a kick, loss, or other well event has occurred.

In one or more embodiments of the present invention, a method of monitoring a well state with intermittent well state sampling can qualify and quantify the well state better than conventional methods because it does not rely solely on measurement at the surface, which inherently includes transit times for pressure changes occurring downhole and elsewhere to propagate through the system. Instead, the method uses available information to calculate an expected volume differential. In this way, when the expected volume differential diverges from the measured volume differential, the user may be alerted to the fact that a kick, loss, or other well event has occurred and respond to contingencies in a more timely and appropriate manner.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of monitoring a well state with intermittent well state sampling comprising:
- determining a measured volume differential comprising:
  - measuring flow out of a wellbore,
  - measuring flow into the wellbore, and
  - calculating a difference between the measured flow out and the measured flow in;
- determining an expected volume differential comprising:
  - calculating a fluid volume of the wellbore system,
  - determining a wellbore pressure difference,
  - determining a well system bulk modulus, and
  - multiplying the fluid volume of the wellbore by the wellbore pressure difference and dividing a result by the well system bulk modulus; and
- if the expected volume differential is not substantially equal to the measured volume differential, reporting to a user that the well state is experiencing a significant change requiring user intervention.

2. The method of claim 1, further comprising measuring a wellbore pressure.

3. The method of claim 2, further comprising controlling the wellbore pressure through applied surface backpressure with a pressure control valve disposed on or near a drilling rig.

4. The method of claim 1, wherein the flow out of the wellbore is measured with a Coriolis flow meter, a wedge meter, or other device capable of measuring volumetric flow rate.

5. The method of claim 1, wherein the flow into the wellbore is measured with a Coriolis flow meter, a wedge meter, or other device capable of measuring volumetric flow rate.

6. The method of claim 1, wherein calculating the measured volume differential comprises calculating a difference between measured continuous values of flow out and measured continuous values of flow in.

7. The method of claim 1, wherein the well system bulk modulus is calculated based on one or more of historical fluid system volumes, pressure data, and volume differential values.

8. The method of claim 2, wherein a change in the wellbore pressure initiates a calculation of an updated bulk modulus value for the wellbore system and an analysis of historical fluid system volume, pressure data, and volume differential values used to calculate the expected volume differential.

9. The method of claim 1, wherein a change to measured flow into the wellbore initiates an analysis of historical fluid system volume, pressure data, and volume differential values used to calculate the expected volume differential.

10. The method of claim 1, wherein an expected volume differential is calculated on a continuous basis through analysis of historical fluid system volume, pressure data, and volume differential values.

11. The method of claim 1, wherein an expected wellbore storage volume is calculated through analysis of instantaneous values of historical fluid system volume, pressure data, and volume differential.

12. The method of claim 1, wherein a change to measured flow out of the wellbore initiates an analysis of historical fluid system volume, pressure data, and volume differential values used to calculate an expected wellbore storage volume.

13. The method of claim 1, wherein an actual wellbore storage volume is calculated using measured volume differential values.

14. The method of claim 1, wherein a data acquisition and control system plots one or more of an actual wellbore storage volume, expected wellbore storage volume, actual wellbore gain, expected wellbore gain, actual wellbore loss, expected wellbore loss, or corrected volume differential for use by an operator.

15. The method of claim 1, wherein a data acquisition and control system compares actual and expected values of wellbore storage at a first time and determines a first well state as an indicator of an influx of formation fluids, a loss of wellbore fluids, or a hydraulic connection of additional fluid volumes.

16. The method of claim 1, wherein a data acquisition and control system alerts a user of a deviation from expected wellbore storage volume, expected gain, expected loss, or corrected volume differential.

17. The method of claim 1, wherein a data acquisition and control system compares actual and expected values of wellbore storage volume at a second point in time and determines a second well state as an indicator of an influx of formation fluids, a loss of wellbore fluids, or a hydraulic connection of additional fluid volumes.

18. The method of claim 1, wherein a first and a second well state are compared to indicate whether the well state is improving, unchanged, or degrading with time.

19. The method of claim 1, wherein a data acquisition and control system analyses actual and expected values of wellbore storage volume to determine a worst-case surface pressure following an influx event based on an analysis of historical fluid system volume, pressure data, and volume differential values.

20. The method of claim 1, wherein a data acquisition and control system alerts a user when a worst-case surface pressure following an influx event exceeds an allowed surface pressure of a drilling system.

* * * * *